Inventors:
GERHARD HANS STADE
GEORG FRIEDRICH STAHN

Inventors:
GERHARD HANS STADE
GEORG FRIEDRICH STAHN

United States Patent Office 3,137,103
Patented June 16, 1964

3,137,103
GRINDER
Gerhard Hans Stade, Berlin, and Georg Friedrich Stahn, Berlin Tegel, Germany, assignors to Firma Herbert Lindner G.m.b.H. & Co., Berlin Wittenau, Germany
Filed Sept. 4, 1963, Ser. No. 306,485
Claims priority, application Germany Sept. 26, 1962
10 Claims. (Cl. 51—165)

This invention relates to grinding machines and, more particularly, to an improved means for automatically compensating for loss of grinding disc material, as by reduction in diameter of the grinding disc, due to truing of the grinding disc.

The present invention is directed particularly to grinding machines of the type including a main feed adjustment spindle threadedly engaged with a spindle nut displaceable relative to the machine bed, and further including a truing slide displaceable relative to the slide supporting the grinding wheel spindle, this truing slide also being provided with an adjusting spindle.

In this type of machine, it is known to provide means for compensating for the loss of grinding disc material, occurring during truing, by adjusting the truing slide, carrying the truing tool, in accordance with adjustment of the feeding means for the grinding spindle slide. Furthermore, other compensating devices are known wherein the compensation is effected through pawl and ratchet means.

These known devices have the disadvantage that the adjustment is effected by way of clutches and mechanical members, whereby coupling and division errors may occur which become cumulative and thus cause inexact operation.

The present invention is directed to a grinding disc material removed during truing, this compensating adjustment comprising a compensation gearing or transmission by means of which the grinding disc is adjusted, toward the workpiece, by an amount exactly corresponding to the feed adjustment of the truing tool relative to the grinding disc.

An object of the present invention is to avoid the coupling and division errors of prior art machines, and by means of a very simple arrangement.

In the invention arrangement, this objective is accomplished by providing a spindle which serves to effect the compensation, and this spindle is operatively associated with the spindle nut threaded on the main feed adjusting spindle and also drives the feed adjustment spindle for the truing tool. By the arrangement of the invention, the main feed adjustment mechanism on the one hand, and the truing or compensation adjustment mechanism on the other hand, may be actuated independently of each other while it is still possible to adjust or set any desired amount of truing and to compensate this amount with great exactness. This is accomplished by relatively simple means.

The compensating mechanism of the present invention make take several forms. For example, the compensation spindle may be mounted so as to be axially non-displaceable relative to the grinding spindle slide, and may be connected with the truing feed adjustment spindle by gearing. The compensation spindle may be threaded through the nut which is threaded on the main feed adjustment spindle, with this nut being constructed as a double or dual nut with the compensation spindle thus being displaceable axially relative to the machine bed. The main feed adjustment spindle and the compensation spindle may be arranged in spaced relationship, either one above the other or laterally adjacent each other. Alternatively, the main feed adjustment spindle and the compensation spindle may be arranged in coaxial axially spaced relation and provided with respective nuts which are rigidly interconnected in axially spaced relation. In an arrangement of the latter type, the compensation spindle and the truing feed spindle are oppositely threaded with the same pitch and are interconnected by means of gearing. However, the pitches may be different and the difference in pitch may then be compensated by providing the proper gear ratio so that exact equality of the truing and compensation transmission is established.

In another embodiment, the truing feed adjustment spindle and the compensation spindle may comprise a single spindle having two threads of opposite hand but the same pitch. The truing feed adjustment spindle is mounted so as to be axially non-displaceable in the grinding spindle slide, and interconnection of the spindle nut of the main feed adjustment spindle is effected by interengageable follower abutments. In this embodiment, the grinding spindle slide preferably is continuously biased toward the workpiece by a hydraulic actuator, with this hydraulic actuator also effecting the rapid stroke of the grinding spindle slide.

Alternately, the hydraulic actuator provided for effecting the rapid stroke may be effective at the main feed adjustment spindle which then is displaceable axially by the amount of the rapid stroke.

For an understanding of the principles of the invention, reference is made to the following description of typical embodiments thereof as illustrated in the accompanying drawings.

Figure 1:
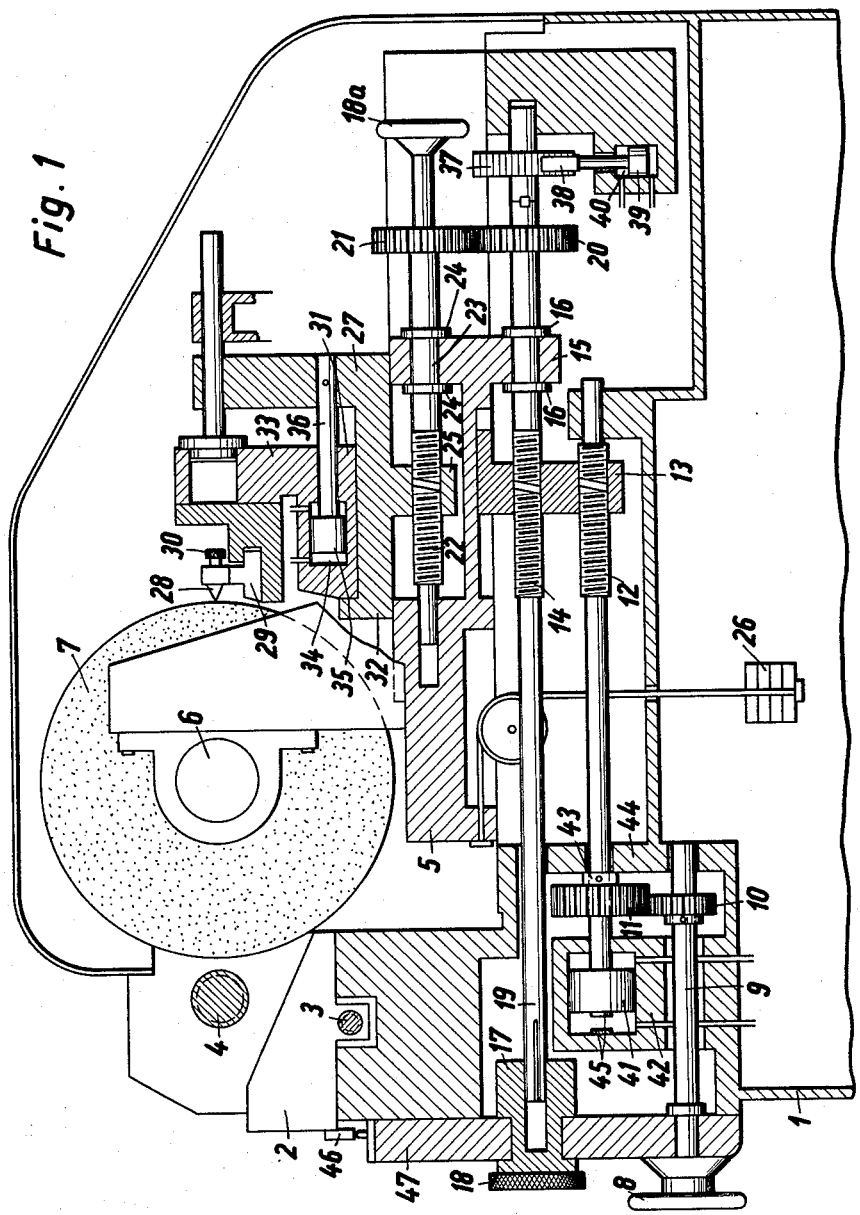
FIG. 1 is a transverse section through a thread grinding machine provided with the compensating mechanism of the invention, the section being taken through the feed adjustment and the compensation mechanisms.
Figure 2:
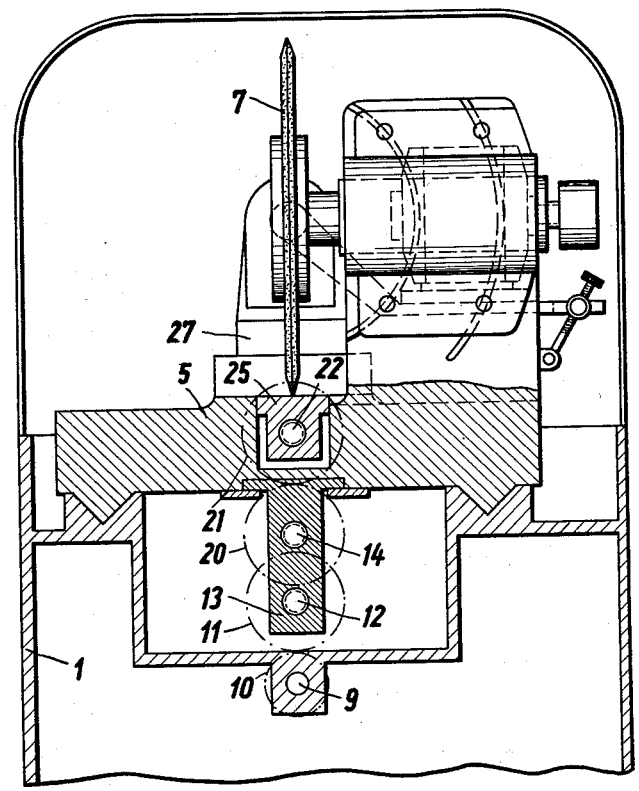
FIG. 2 is a side elevation view, partly in section, of the machine shown in FIG. 1.

Referring to FIGS. 1 and 2, the grinding disc of a thread grinding machine is illustrated as retracted from the workpiece and in position for the truing operation. The machine includes a bed 1 on which a workpiece slide 2 is mounted for longitudinal displacement by means of a spindle 3 threaded through a nut on the slide 2. The workpiece is indicated at 4. A grinding spindle slide 5 is adjustable relative to bed 1 in a direction transverse to the adjustment direction of the workpiece slide 2. Slide 5 mounts the spindle 6 for the grinding wheel 7 effective to operate on the workpiece 4.

Hand wheel 8 is provided for fine feed adjustment, and is secured to a shaft 9 which is rotatably mounted in bed 1 against axial displacement. A gear wheel 10 is secured on the shaft 9 and meshes with a gear wheel 11 secured on the main feed adjustment spindle 12. Main feed adjustment spindle 12 is threaded through a spindle nut 13 without play. Nut 13 is constructed as a double or dual nut and, in accordance with this embodiment of the invention, is mounted for axial displacement in grinding spindle slide 5. However, the nut 13 may be guided in the machine bed 1.

Operative connection of nut 13 with grinding spindle slide 5 is effected by means of compensation spindle 14 which is threaded through nut 13 and is secured in slide 5 so as to be rotatable but not displaceable axially relative thereto. For this purpose, spindle 14 has collars or flanges 16 engaging opposite sides of a bearing 15.

In the arrangement shown, double nut 13 is illustrated as arranged to have spindles 12 and 14 extend therethrough in vertically spaced relation. However, it is perfectly possible for shafts 12 and 14 to extend through nut 13 in laterally displaced relation.

Spindle 14 moves with slide 5 and, for this purpose, the left end 19 of spindle 14, as viewed in FIG. 1, is axially displaceable in an axial bore in a body 17 of a rotatably mounted manual adjustment member 18. Driving connection between member 18 and spindle 14 may be effected by a key or by proper cross-sectional shape of the interfitting bore and spindle portion 19. Body 17 acts as a second bearing for shaft 14 and enables not only rotation of spindle 14 but also axial displacement thereof.

Adjacent bearing 15 for spindle 14, a gear 20 is fixed to the spindle and meshes with a gear 21 fixed to a truing slide adjustment spindle 22. Spindle 22 has a bearing area 23 in bearing 15, and collars 24 secured to spindle 22 on either side of bearing 15 prevent axial displacement of spindle 22 relative to grinding spindle slide 5. A nut 25 is threaded on spindle 22 without play, any play being compensated by weights 26 which are suspended on a cable trained over a pulley and attached to slide 5. Nut 25 is fixed relative to slide 27 which is movable on slide 5 in a direction transverse to grinding spindle 6.

The truing tool 28 may be a diamond truing device or a rolling pin device, and is positioned in a holding means or clamp 29 in which it is initially adjustable by means of an adjusting screw 30. Truing slide 27 slidably supports a slide 33 by means of bearing areas 31, movement of slide 33 being limited by abutments 32. Slide 32 is formed with a cylinder 34 in which there is a piston 35 secured to a rod 36 anchored to truing slide 27. Slide 33 is thus movable in either direction relative to truing slide 27 dependent upon which side of piston 35 has hydraulic or pneumatic pressure applied thereto. In the illustrated position, the left side of piston 35 has pressure applied thereto so that slide 33 is moved against left-hand abutment 32. In this position, truing device 28 is in truing position relative to grinding disc 7. If pressure is applied to the right side of piston 35, truing tool 28 is retracted from the grinding disc 7 by virtue of slide 33 being moved to the right.

Rearwardly of grinding spindle slide 5, feed adjustment spindle 22 may have a hand operating wheel 18a secured thereto. To provide for automatic adjustment of the compensation, a ratchet wheel 37 may be secured to compensating shaft 14 and be operatively associated with a pawl 38. Pawl 38 is operated by a piston 39 which is movable in a cylinder 40 and may have pressure applied to either side thereof. The amount of truing may be adjusted by proper adjustment of the stroke of pawl 38.

A piston 41 is secured to the left end of main feed adjustment spindle 12 and is disposed in a cylinder 42 formed in machine bed 1. The arrangement constitutes a hydraulic actuator by means of which spindle 12 may be displaced axially relative to the machine bed. In the illustrated position of spindle 12, further movement to the right is limited by engagement of collar 43 of gear 11 with a partition or wall 44 of the machine bed, the left-hand side of piston 41 being under pressure. In this position of spindle 12, grinding disc 7 is retracted from workpiece 4 for the truing operation. Movement of spindle 12 to the left, or in the opposite direction, is limited by interengageable abutments 45, one on the inner end surface of cylinder 42 and the other on the left-hand face of piston 41. In its left-hand position, disc 7 is in grinding position with respect to workpiece 4 and feeding is accomplished by operation of hand wheel 8.

In order to grind profiles with the greatest accuracy, it is recommended that a truing operation be effected after each longitudinal stroke or passage. For this purpose, and in known manner, abutments 46 on workpiece slide 2 are cooperable with suitable reversing means 47.

When grinding disc 7 is to be trued, motion of workpiece slide 2 is interrupted and grinding spindle slide 5, together with all the parts connected thereto, is retraced from workpiece 4 by means of the rapid stroke device 41, 42, by applying pressure to the left-hand surface of piston 41. If, at this time, and for the purpose of truing disc 7, either hand wheel 18 or 18a is rotated, compensation spindle 14 moves relative to spindle nut 13 which is stationary because main feed adjustment spindle 12 is stationary. Thereby, grinding spindle slide 5 is moved toward the left or toward workpiece 4 a distance exactly equal to the truing feed which has been adjusted by operation of the hand wheel 18 or 18a. Truing slide 27 is moved in the same direction and to the same extent as grinding spindle slide 5, by virtue of the interconnection of spindles 14 and 22 through gears 20 and 21. This movement of slide 27 is relative to grinding wheel slide 5. The movements of both slides, 5 and 27, are exactly of the same magnitude so that the loss of material of the grinding disc, or the reduction in diameter thereof, due to the truing operation, is exactly compensated by a corresponding movement of grinding spindle slide 5.

The total adjustment during truing includes an adjustment for the wear of the grinding disc due to the previous grinding operation as well as an adjustment for the amount of truing or the amount which truing tool 28 reduces the radius of grinding disc 7. If the hydraulic rapid adjusting gear 41, 42 is now operated in a direction to move grinding disc 7 toward workpiece 4, then the grinding edge of disc 7 will be at exactly the same distance from the workpiece axis as it was prior to the truing operation.

Figure 3:
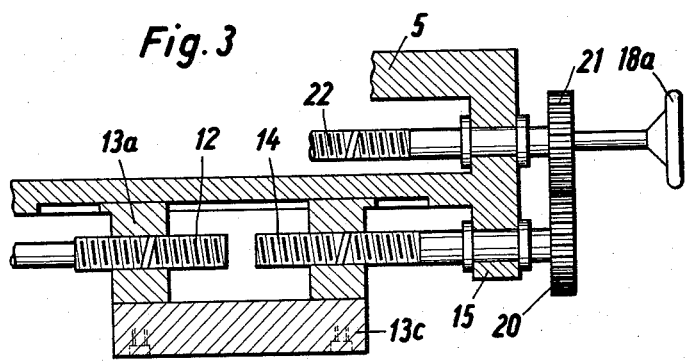
FIG. 3 is a detailed sectional view illustrating a modification of a portion of FIG. 1.

FIG. 3 illustrates a modified arrangement which differs from that of FIGS. 1 and 2 in that main feed adjustment spindle 12 and compensation spindle 14 are arranged in coaxial axially spaced relation. In this modification, spindle nut 13 is divided into two nuts 13a and 13b which are rigidly or fixedly interconnected by a bridge member 13c. Spindle nuts 13a and 13b are suitably guided for movement relative to the machine bed parallel to the axes of spindles 12 and 14. In this embodiment, the truing amount is adjusted by hand wheel 18a in the same manner as in the embodiment of FIGS. 1 and 2.

Figure 4:
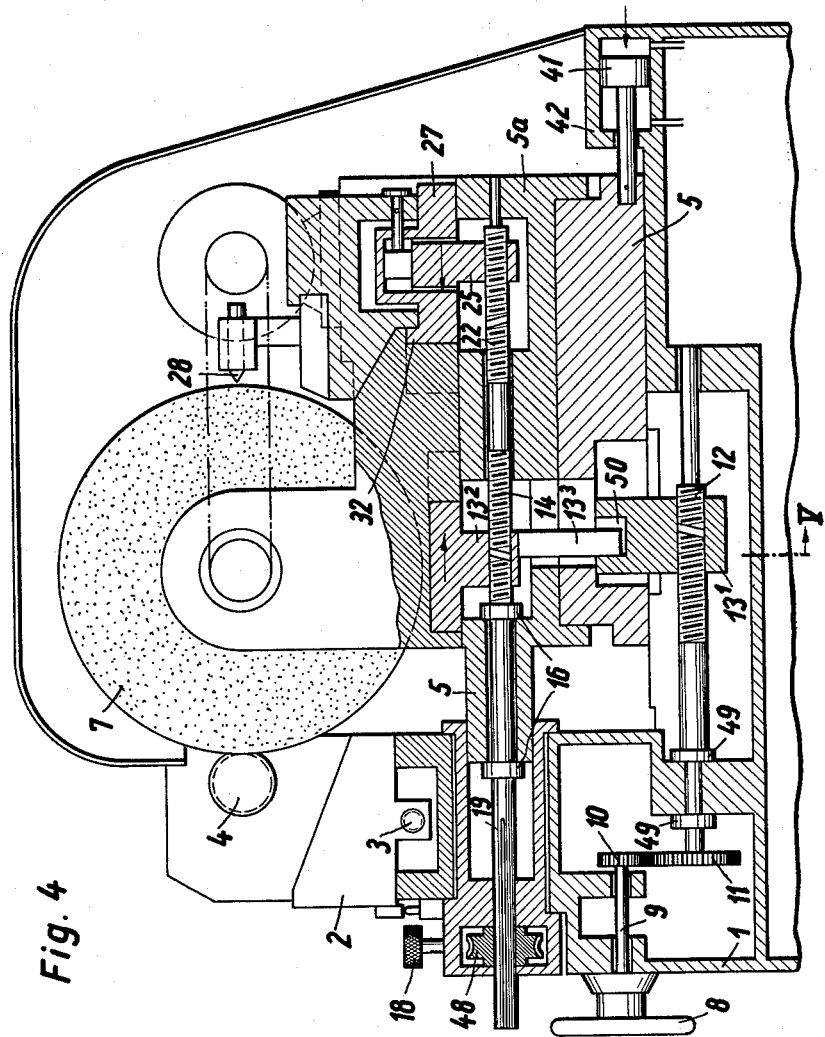
FIG. 4 is a view similar to FIG. 1 illustrating another embodiment of the invention.
Figure 5:
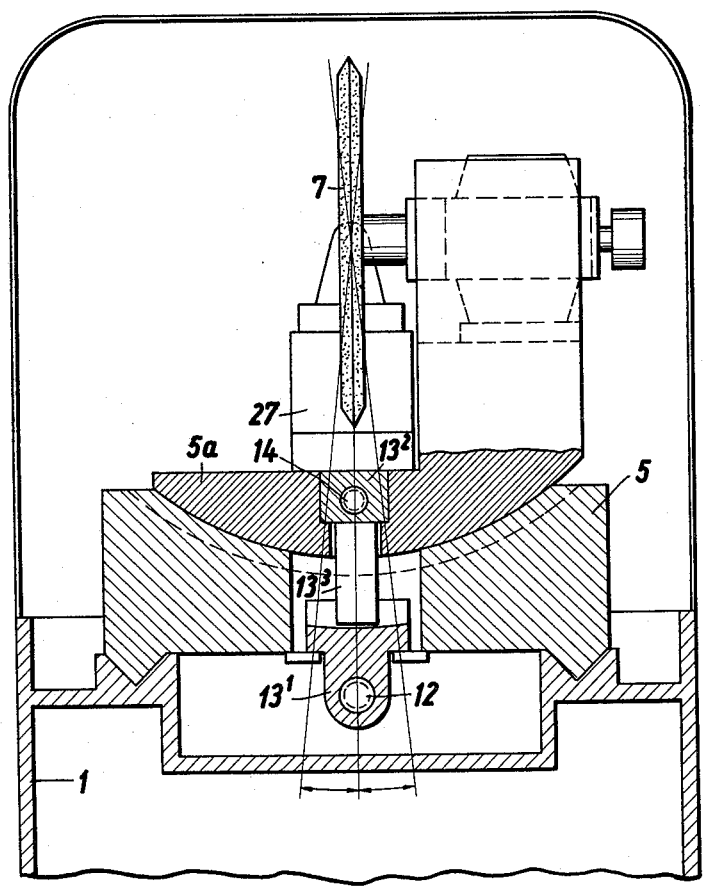
FIG. 5 is a side elevation view, partly in section, of the machine shown in FIG. 4, the section being taken on the line V of FIG. 4.

A further embodiment is shown in FIGS. 4 and 5. In FIGS. 4 and 5, disc 7 is shown in operative relation to workpiece 4, and elements performing the same function are indicated with the same reference numerals as used in FIGS. 1, 2 and 3.

In contrast to the embodiments of FIGS. 1 and 2, feed adjustment spindle 22 and compensation spindle 14 are not arranged laterally of each other or vertically above each other but are arranged coaxially in axially spaced relation and are combined into a single spindle. Thus, gears 20 and 21 of FIGS. 1 and 2 are no longer necessary, but two axially spaced threads, of opposite hand, must be provided on the single spindle. That portion of the spindle toward the front of the machine has a left-hand thread and that toward the rear has a right-hand thread, and these threads are equal in pitch. The single spindle is mounted in grinding spindle slide 5 so that it is fixed against axial displacement by means of collars 16. Rotation of the spindle may be effected manually by knob 18 through a worm and worm gear arrangement 48.

Feed adjustment spindle 12, in the embodiment of FIGS. 4 and 5, is mounted in machine bed 1 and is held against axial displacement therein, while being rotatable, by means of collars 49. As spindle 12 is not axially displaceable, gear 11 may have the same width as gear 10 secured to shaft 9 having the operating handle 8 secured thereto.

Nut 13 is divided into two nuts $13^1$ and $13^2$, with nut $13^2$ being formed with an abutment $13^3$ which engages in a recess 50 of nut $13^1$. Recess 50 in nut $13^1$ is wider than abutment $13^3$ by the amount of the rapid feed stroke. Abutment $13^3$ operates as a follower abutment. Nut $13^1$ is displaceable, in guided relation, longitudinally of grinding spindle slide 5 and is also displaceable relative to machine bed 1. Nut $13^2$ is fixed relative to grinding spindle slide 5. Operative interconnection between nut $13^1$ and nut $13^2$ is effected by positive engagement of abutment $13^3$ with either the left- or right-hand ends of recess 50. Abutment $13^3$ is biased against the left-hand end or wall of recess 50, as viewed in FIG. 4, by means of piston 41 of a hydraulic actuator including a cylinder 42. Piston 41 is fixed to grinding spindle slide 5.

In contradistinction to the two embodiments previously described, truing slide 27 is slidably mounted on the rocking segment 5a of grinding spindle slide 5, segment 5a providing for joint angular adjustment of the grinding spindle carrier and the truing tool.

If grinding disc 7 is advanced or adjusted by means of hand wheel 8, then nut $13^1$ moves to the left as viewed in FIG. 4. However, the oil pressure continuing to act on piston 41 in the direction of the arrow maintains abutment $13^3$ in engagement with the left-hand wall or end of recess 50. Thus, abutment $13^3$ follows the movement of nut $13^1$, and grinding disc 7 is thus moved against workpiece 4. If pressure is applied to the left-hand surface of piston 41, then the piston performs a retracting stroke equal to the free space of recess 50 or to the difference between the length of the recess and the width of abutment $13^3$. In this case, grinding disc 7 is retracted from workpiece 4 for the truing operation.

To effect the truing, handle member 18 is operated to rotate double spindle 14–22. Since this spindle is fixed against axial displacement relative to slide 5, nuts 25 and $13^2$ are moved toward each other, as indicated by the arrows. Due to the movement of nut 25 toward the left, a truing of the grinding disc is effected in accordance with the operation of knob 18. As a result of the counter movement of nut $13^2$ toward the right, abutment $13^3$ tends to move away from the left-hand end of recess 50 but is maintained in this position since piston 41 continues to bias slide 5 toward the left. Slide 5 follows the leftward movement so that, while maintaining engagement of abutment $13^3$ with the left-hand end of recess 50, it moves the same amount toward the workpiece as the amount of feed of the truing slide. It will be appreciated, of course, that truing tool 28 may have a different location relative to the grinding disc 7.

While specific embodiments of the invention have been shown and described in detail to illustrate the application of the principles of the invention, it will be understood that the invention may be embodied otherwise without departing from such principles.

What is claimed is:
1. In a grinding machine including a machine bed, a work support on said bed, a grinding wheel, a grinding wheel slide rotatably supporting said grinding wheel and mounted for adjustment toward and away from said work support, a main feed adjustment spindle rotatably mounted in said bed and fixed against axial displacement relative thereto, first non-rotatable nut means threaded on said main feed adjustment spindle and displaceable axially relative to said bed, a truing slide mounted for adjustment relative to said grinding wheel slide in a direction parallel to the direction of adjustment of the latter, a truing tool on said truing slide engageable with said grinding wheel upon retraction of the latter from the work support, a truing slide adjustment spindle rotatably mounted in said grinding wheel slide and fixed against axial displacement relative thereto, and a non-rotatable nut threaded on said truing slide adjustment spindle and fixed to said truing slide; means for automatically compensating the working position of said grinding wheel for material removed therefrom during truing, said last-named means comprising, in combination, a threaded compensating spindle rotatably mounted in said grinding wheel slide and fixed against axial displacement relative thereto; second non-rotatable nut means threaded on said compensating spindle; means maintaining said first and second nut means fixed against relative axial displacement during rotation of said compensating spindle; and means interconnecting said truing slide adjustment spindle and said compensating spindle for conjoint and equal angular adjustment upon rotation of said truing slide adjustment spindle; whereby, upon adjustment of said truing slide for truing of said grinding wheel, said grinding wheel slide is adjusted, relative to said main feed adjustment spindle, by exactly the amount of said truing slide adjustment.

2. In a grinding machine, automatic compensating means as claimed in claim 1, in which said first and second nut means comprise two threaded bores in a single nut, each threaded bore receiving a respective one of said main feed adjustment spindle and said compensating spindle; said compensating spindle being mounted for axial adjustment relative to said machine bed.

3. In a grinding machine, automatic compensating means as claimed in claim 1, in which said main feed adjustment spindle and said compensating spindle extend in laterally spaced parallel relation.

4. In a grinding machine, automatic compensating means as claimed in claim 1, in which said main feed adjustment spindle and said compensating spindle are arranged in coaxial axially spaced relation; said means maintaining said first and second nut means fixed against each other, comprising a bridge fixedly interconnecting the axially spaced first and second nut means.

5. In a grinding machine, automatic compensating means as claimed in claim 1, in which said truing slide adjustment spindle and said compensating spindle have threads of the same hand and the same pitch and extend in laterally spaced parallel relation to each other; said interconnecting means comprising a gear on said truing slide adjustment spindle meshing with a gear on said compensating spindle.

6. In a grinding machine, automatic compensating means as claimed in claim 1, in which said truing slide adjustment spindle and said compensating spindle comprise a single spindle having axially spaced threads of opposite hand.

7. In a grinding machine, automatic compensating means as claimed in claim 6, in which said single shaft is rotatably mounted in the grinding spindle slide and is fixed against axial displacement relative thereto.

8. In a grinding machine, automatic compensating means as claimed in claim 7, said first nut means comprising a nut on said main feed adjustment spindle displaceable axially thereof relative to said grinding wheel slide; said second nut means comprising a nut on said compensating shaft fixed to said grinding wheel slide against axial displacement relative thereto; said first nut means having an axially elongated recess therein; said second nut means having an abutment extending into said recess.

9. In a grinding machine, automatic compensating means as claimed in claim 8, including hydraulic actuator means normally biasing said grinding wheel slide toward said work support to maintain said abutment engaged with the end of said recess nearest said work support.

10. In a grinding machine, automatic compensating means as claimed in claim 9, said hydraulic actuator means further constituting means for effecting a rapid stroke of the grinding wheel slide.

References Cited in the file of this patent
UNITED STATES PATENTS

| | | |
|---|---|---|
| 2,310,977 | Mathys | Feb. 16, 1943 |
| 2,545,730 | Fouquet | Mar. 20, 1951 |
| 2,944,373 | Mentley et al. | July 12, 1960 |